United States Patent [19]

Kehl et al.

[11] Patent Number: 4,701,990
[45] Date of Patent: Oct. 27, 1987

[54] BALL-AND-SOCKET JOINT ASSEMBLY TOOL AND METHOD

[75] Inventors: Georg Kehl, Stuttgart; Ernst-Dieter Schafer, Pliezhausen, both of Fed. Rep. of Germany

[73] Assignee: Robert Bosch GmbH, Stuttgart, Fed. Rep. of Germany

[21] Appl. No.: 937,179

[22] Filed: Dec. 2, 1986

[30] Foreign Application Priority Data

Mar. 5, 1986 [DE] Fed. Rep. of Germany ....... 3607149

[51] Int. Cl.$^4$ .................. B23P 11/00; B23P 11/02; B23P 19/00; B21D 53/10
[52] U.S. Cl. ............................ 29/441 R; 29/149.5 B; 29/453; 29/700; 81/485; 81/488; 403/76; 403/373; 403/374
[58] Field of Search .................. 29/441, 149.5 B, 453, 29/700; 403/56, 76, 90, 373, 374; 81/177.75, 485, 486, 488

[56] References Cited

U.S. PATENT DOCUMENTS

| | | | |
|---|---|---|---|
| 3,422,520 | 1/1969 | Bannister | 29/441 X |
| 3,733,966 | 5/1973 | Brown, Jr. | 91/372 |
| 3,806,215 | 4/1974 | Price et al. | 403/374 X |
| 3,857,149 | 12/1974 | Hassan | 29/149.5 B |
| 3,909,046 | 9/1975 | Legris | 403/374 X |
| 3,918,779 | 11/1975 | Halliger et al. | 403/374 X |

FOREIGN PATENT DOCUMENTS 0659600 5/1938 Fed. Rep. of Germany .
113620 7/1983 Japan ...................................... 403/56

Primary Examiner—P. W. Echols
Assistant Examiner—Ronald S. Wallace
Attorney, Agent, or Firm—Edwin E. Greigg

[57] ABSTRACT

A self-securing ball-and-socket joint which has a ball head integrally formed on a rod, an outer structural part having a bore that pivotably receives the ball head and a radially elastic CIRCLIP brand retaining ring as well as a separate auxiliary assembly tool for the retaining ring. In the outer structural part beside the center of the ball head, there is a circumferential groove having a support face for the retaining ring. When the ball-and-socket joint is assembled, the retaining ring is first inserted into the circumferential groove. Then the auxiliary assembly tool is inserted into the bore. At its initial end the auxiliary assembly tool is embodied in the manner of a centering and expansion tool, so that it aligns the retaining ring with respect to the circumferential groove and finally forces it into this groove. Upon further displacement of the auxiliary assembly tool, the retaining ring snaps home into a detent notch provided on the circumference of the auxiliary assembly tool. As a result, the retaining ring is prevented from falling out of the outer structural part. For final assembly of the ball-and-socket joint, all that remains to be done is to insert the ball head in the course of which the auxiliary assembly tool moves away from the CIRCLIP retaining ring and the CIRCLIP retaining ring finally snaps home into its securing position in the groove in the rod outwardly of the ball head.

9 Claims, 4 Drawing Figures

BALL-AND-SOCKET JOINT ASSEMBLY TOOL AND METHOD

BACKGROUND OF THE INVENTION

The present invention is based on a ball-and-socket joint as defined hereinafter. German Pat. No. 659 600 discloses a ball-and-socket joint the radially elastic retaining ring, such as a CIRCLIP brand retaining ring, of which extends into a circumferential groove located on the outer structural part, this groove forming a support face in the form of a closed ring for the CIRCLIP retaining ring in the event that tensile forces are acting on the rod on which the ball head is integrally formed. Viewed from the rod toward the center of the ball head, the circumferential groove is increasingly deeper. During assembly, the CIRCLIP retaining ring is first introduced into the circumferential groove. After the ensuing insertion of the ball head that is to be secured, the CIRCLIP retaining ring assumes its securing position increasingly more reliably, the smaller its inside diameter becomes. An advantageous diameter for this purpose has the disadvantage, however, that upon insertion of the ball head, the CIRCLIP retaining ring may not enter the circumferential groove and so may be damaged or even pushed into the socket, and as a result may not perform its assigned task.

OBJECT AND SUMMARY OF THE INVENTION

The ball-and-socket joint according to the invention has the advantage of easy and reliable assembly of the ball-and-socket joint, even in the course of automated manufacture, since when the tool for centering and expansion is inserted the CIRCLIP retaining ring is centered relative to the circumferential groove, and then is positively displaced, undamaged, into the circumferential groove.

The invention advantageously provides that the CIRCLIP retaining ring can be preassembled in the outer structural part by the manufacturer of the ball-and-socket joint, and that the customer can then introduce the ball head conveniently, for instance, by using an assembly robot. This prevents the CIRCLIP retaining ring from being lost while on its way to the customer. The invention also includes provisions that assure a compact structure. Finally, the invention assures that when the centering and expansion tool is displaced by the ball head, the CIRCLIP retaining ring remains at a sufficient depth in the circumferential groove. This prevents tilting of the CIRCLIP retaining ring, which would damage it.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
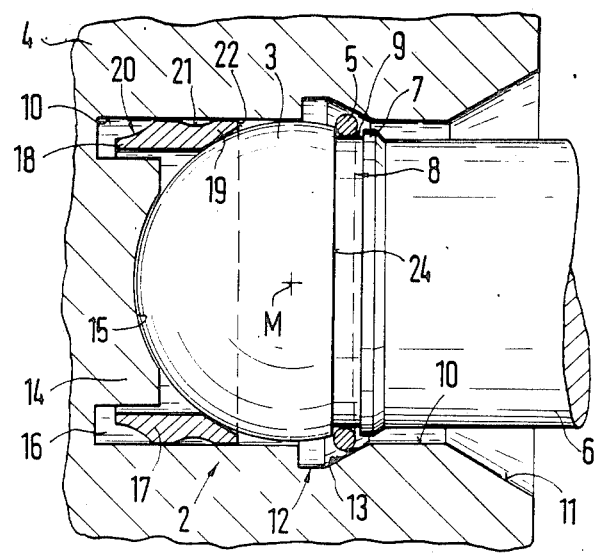
FIG. 1 shows the ball-and-socket joint according to the invention in the assembled state in a longitudinal section.

The ball-and-socket joint 2 has a ball head 3, an outer structural part 4 and a CIRCLIP retaining ring 5 for securing the ball head within the structural part 4. A CIRCLIP brand retaining ring is a spring steel ring which is cut across its diameter so that the ring will expand to a larger diameter with a spacing between the cut ends.

The ball head 3 is for example formed as a spherical portion which is greater than a semi-sphere and integrally connected to a cylindrical rod 6. Near the ball head 3, the rod 6 has an integral collar 7 which forms a circumferential groove 8 between the collar 7 and the ball head 3. The circumferential groove 8 is wide enough that the CIRCLIP retaining ring 5 can enter it and rest on the bottom 9 of the circumferential groove 8.

The outer structural part 4 has a cylindrical blind bore 10, the diameter of which is large enough that it can pivotably receive the ball head 3. A coaxially extending stub portion 14 is formed in the bottom of the bore by an annular space 16. The stub portion has a coaxial concavely curved face 15 having a center substantially the same as the radius of the ball portion. A funnel-like bore section 11 precedes the cylindrical bore 10 and serves to allow easy introduction of the ball head 3 outwardly of the center of the concave face 15, into the cylindrical bore 10. There is a circumferential groove 12 in the outer structural part 4 which has an outwardly extending conical groove bottom 13 that extends axially as far as the collar 7 on the rod 6 when the ball is in place in the structure 4 is outwardly of the groove 12. The circumferential groove 8, which is associated with the ball head 3, is radially opposite groove bottom 13, which is embodied in the form of a hollow conical section, the hollow cone opening toward the groove 12 as viewed from the end 11. The groove bottom 13 forms as annular support face for the CIRCLIP retaining ring 5 in the event that tension is exerted upon the rod 6. The circumferential groove 12 is embodied such that it is deep and wide enough that there is enough space in the groove for the entire cross section of a wire from which the CIRCLIP retaining ring 5 is made. The coaxially extending stub portion 14 is oriented toward the ball head 3 for absorbing pressure forces.

An annular space 16 is arranged between the stub portion 14 and the cylindrical bore 10. As an additional structural part, an auxiliary assembly tool 17 becomes part of the ball-and-socket joint 2. This tool is substantially tubular and on its front end 18 that enters into the annular chamber 16, it is embodied as a centering tool. At the front end 18, the auxiliary assembly tool 17 has a diameter that is smaller than the inside diameter of the CIRCLIP retaining ring 5 and then a slightly curved annular face is disposed between the front end 18 and an annular wall 20a which slidably engages the cylindrical bore 10. Immediately adjacent to the annular wall 20a there is provided on the circumference of the tool 17 approximately in the middle of the auxiliary assembly tool 17, a circumferential-groove-like detent notch 21. This maximum diameter is advantageously as large as the diameter of the ball head 3. Starting at the initial end 18, the auxiliary assembly tool 17 may have a concave rounded contour 20. At its terminal end 19, the auxiliary assembly tool 17 is in the shape of a hollow cone, for example, or is formed complementally to the shape of the ball head 3, so that only a narrow annular face 22 remains as an end face at the terminal end 19.

Figure 2:
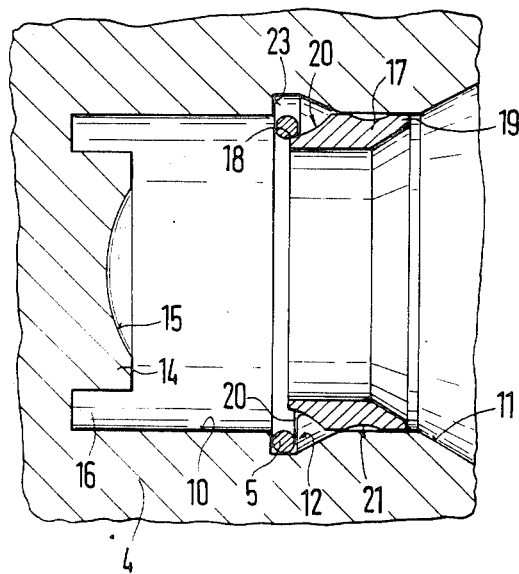
FIGS. 2–4 show the ball-and-socket joint of FIG. 1 in various stages of the assembly process.
Figure 3:
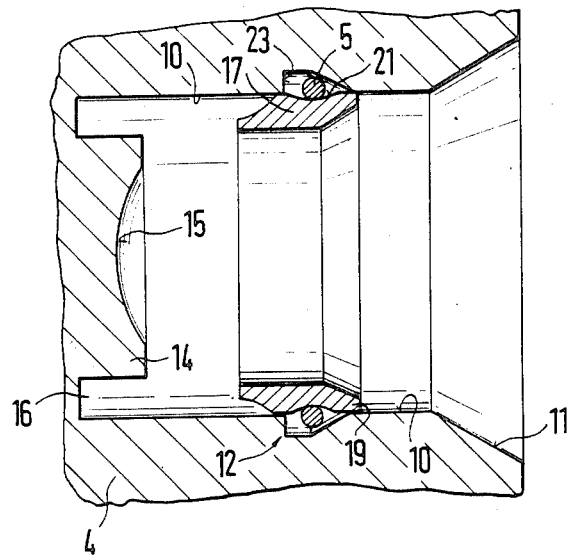
Figure 4:
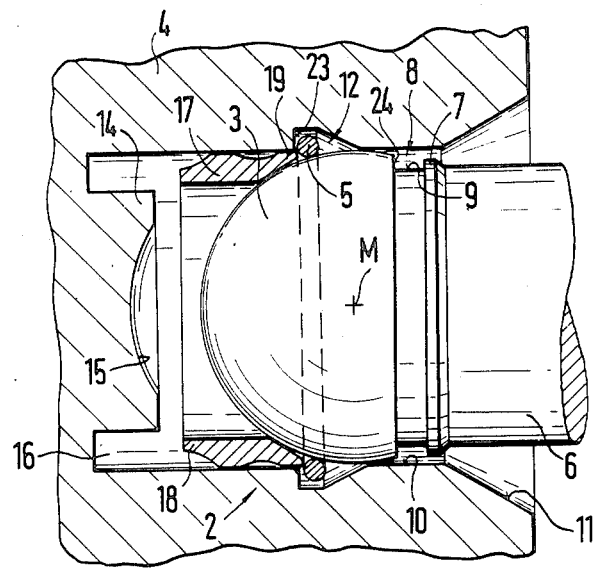

FIGS. 2, 3 and 4 shows various steps in the process of assembling the ball-and-socket joint 2.

During assembly, the CIRCLIP retaining ring 5 is first introduced into the circumferential groove 12 of the outer structural part 4, as shown in FIG. 2. Then the auxiliary assembly tool 17 is pushed through the conical bore section 11 and into the cylindrical bore 10. In this process, the front end 18 of the contour 20 finally meets the CIRCLIP retaining ring 5, as shown. Upon further insertion of the auxiliary assembly tool 17 in the direction of the annular chamber 16, the CIRCLIP retaining ring 5 becomes oriented centrally to the circumferential groove 12 by means of the generally curved contour 20, which as already indicated acts as a centering tool. Upon continued insertion of the auxiliary assembly tool 17 toward the annular chamber 16, the curved contour 20 acts as an expansion tool. Because the CIRCLIP retaining ring 5 is supported in the axial direction by one flank 23 of the circumferential groove 12, the CIRCLIP retaining ring 5 expands elastically in the radial direction and finally enters fully into the circumferential groove 12. As a result, the largest diameter of the auxiliary assembly tool 17 can move past the flank 23 of the circumferential groove 12. Finally, as shown in FIG. 3, the detent notch 21 becomes aligned with respect to the CIRCLIP retaining ring 5, so that the CIRCLIP retaining ring 5, biased by its elastic expansion, moves securely into the detent notch 21. As the term "detent notch" already suggests, the CIRCLIP retaining ring 5 that simultaneously enters the detent notch 21 and the circumferential groove 12 forms a securing means that resiliently fixes the auxiliary assembly tool 17 in the cylindrical bore 10. As a result, the auxiliary assembly tool 17 is prevented from falling out, for instance while the outer structural part 4 is being shipped from the manufacturer to the customer; on the other hand, however, the auxiliary assembly tool 17, by overcoming the securing forces dictated by the elasticity of the CIRCLIP retaining ring 5, is capable of being displaced further toward the annular chamber 16 when the ball-and-socket joint 2 is finally installed.

For complete assembly of the ball-and-socket joint 2, the integrally formed ball head 3 is inserted by means of the rod 6 through the funnel-like bore section 10 of the outer structural part 4 into the cylindrical bore 10. The ball head 3 finally enters the end 19 of the auxiliary assembly tool 17 and comes to rest at this end 19. Upon further movement of the ball head 3 toward the joint face 16, the elastic securing force of the CIRCLIP retaining ring 5 is overcome, and the auxiliary assembly tool 17 moves in front of and along with the ball head 3 toward the annular chamber 16. In so doing the assembly tool finally moves past the circumferential groove 12, so that the CIRCLIP retaining ring 5, which because of the disposition of the groove flank 23 cannot follow along with the further movement of the auxiliary assembly tool 17, presses against the ball head 3. This stage in the assembly is shown in FIG. 4. Upon further displacement of the ball head 3 and the assembly tool toward the joint face 15, the center M of the ball head migrates through the CIRCLIP retaining ring 5. Finally, because of its elastic bias, the CIRCLIP retaining ring 5 slides along the now-decreasing diameter of the ball head 3 toward the circumferential groove 8 and ultimately snaps therein. As a result, the CIRCLIP retaining ring 5 rests on the bottom 9 of groove 8. Once the CIRCLIP retaining ring 5 has snapped into its proper position, the ball-and-socket joint 2 is fully assembled and held within the socket, as shown in FIG. 1.

The dimensions of the circumferential grooves 8 and 12 and the orientation of the groove bottom 13 of the outer circumferential groove 12 are adapted to one another such that when pressure is exerted upon the rod 6, a minimum distance remains between the groove bottom 13 and the CIRCLIP retaining ring 5, which assures a desired pivotability of the ball head 3 inside the outer structural part 4. If pressure forces arise at the rod 6 during the pivoting, then they are mostly predominantly transmitted via the ball head 3 to the joint face 15. The joint face 15 and supplementarily the cylindrical bore 10 as well form a ball socket. Contrarily, if tensile forces are exerted on the rod 6, then the rod 6 pulls the ball head 3 together with the CIRCLIP retaining ring 5 against the bottom 13 of the circumferential groove 12 located in the outer structural part 4. As already mentioned, the groove bottom 13 forms an annular support face for the CIRCLIP retaining ring 5. Because of the above-mentioned hollow-conical form of the support face 13, the CIRCLIP retaining ring 5 is pressed increasingly firmly against the groove bottom 9 with increasing tensile force at the rod 6. A groove flank 24 in the form of a closed ring, which is located between the ball head 3 and the groove bottom 9, forms a stop for the CIRCLIP retaining ring 5 that is operative in the axial direction. The shaping of the support face 13 as a closed ring prevents the CIRCLIP retaining ring 5 from climbing radially outward beyond this groove flank 24, because if the CIRCLIP retaining ring were able to do so it would fail to secure the ball head 3.

It is additionally noted that instead of the tubular auxiliary assembly tool 17 shown, a cup-shaped auxiliary assembly tool, not shown, can also be used. Such a tool would then be embodied as a ball socket on its interior, by way of example.

The ball-and-socket joint described above can be used, among other applications, for connecting brake pedal linkages to brake boosters, brake valves and master brake cylinders.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A method of assembling ball and socket members to provide an unrestricted joint therebetween comprising the steps of forming a ball-shaped member on a rod element terminating in an annular wall on one end of the rod element, forming an annular collar on said rod adjacent said ball-shaped member to form a first circumferential groove between said annular wall and said collar, forming an outer structure having a cylindrical blind bore having conically an inner wall, forming a conically flared entrance area having a throat for receiving said ball-shaped member, said entrance area throat being contiguous with said inner wall, forming a coaxially extending stub portion in said blind bore, with a coaxial concave curved face surrounded by an annular space, forming a second circumferential groove with a conical groove bottom in said inner wall axially spaced from said curved face on said stub portion, positioning a radially elastic retaining ring in said second circumferential groove, forming an annular assembly tool with a contour on the outer surface of one end and a conical section on the inner surface of the opposite end with an annular groove between the ends, inserting said assembly tool into said outer structure to center said retaining ring in said second circumferential groove and to force said retaining ring onto said annular groove on said assembly tool, inserting said ball shaped member into said throat of said outer structure to seat on said conical end section of said assembly tool forcing said ball shaped member into said outer structure thereby, forcing said assembly tool through said retaining ring and an end portion thereof into said annular space with said ball shaped member passing through said retaining ring whereupon said retaining ring enters said first circumferential groove disposed between said collar and said ball element on said rod thereby securing the ball element in said outer structure.

2. A socket and assembly tool for assembling a ball head integrally formed on a rod, in the socket by use of a radially elastic retaining ring which assembly tool comprises an outer structural part having a cylindrical blind bore, which bore forms an inner wall, an axially extending stub portion surrounded by an annular space, said annular stub having a coaxial concave face, a circumferential groove in the inner wall outwardly of a center point for said concave face an annular support face extending outwardly from said circumferential groove which widens substantially conically toward the open end of said blind bore said radially elastic retaining ring supported in said circumferential groove; an auxiliary assembly tool for introduction into said outer structural part for holding said retaining ring in said circumferential groove of the outer structural part, said auxiliary assembly tool including an inner centering end for centering said retaining ring, an outer centering end for centering said ball head and an intermediate portion for receiving said retaining ring which holds said assembly tool within said blind bore.

3. A socket and assembly tool as defined by claim 2, in which the intermediate portion of said auxiliary assembly tool has a detent notch on its circumference which partially receives the CIRCLIP retaining ring.

4. A socket assembly tool as defined by claim 3, in which said auxiliary assembly tool is tubular in embodiment, and a portion thereof is received within said annular space during assembly of said ball.

5. A socket and assembly tool as defined by claim 4, in which said auxiliary assembly tool is embodied on its outward end oriented toward said ball head during assembly such that the ball head can enter the confines of said tool to an extent of approximately one-fourth of its axial dimensions.

6. A socket and assembly tool as defined by claim 3, in which said auxiliary assembly tool is embodied on its outward end oriented toward said ball head during assembly such that the ball head can enter the confines of said tool substantially to an extent of approximately one-fourth of its axial dimensions.

7. A socket assembly tool as defined by claim 2, in which said auxiliary assembly tool is tubular in embodiment, and a portion thereof is received within said annular space during assembly of said ball.

8. A socket and assembly as defined by claim 7, in which said auxiliary assembly tool is embodied on its outward end oriented toward said ball head during assembly such that the ball head can enter the confines of said tool substantially to an extent of approximately one-fourth of its axial dimensions.

9. A socket and assembly tool as defined by claim 2, in which said auxiliary assembly tool is embodied on its outward end oriented toward said ball head during assembly such that the ball head can enter the confines of said tool substantially to an extent of approximately one-fourth of its axial dimensions.

* * * * *